United States Patent [19]

Jacoff

[11] 4,376,456
[45] Mar. 15, 1983

[54] HACK SAW FRAME

[75] Inventor: Daniel Jacoff, Mineola, N.Y.

[73] Assignee: Great Neck Saw Manufacturers, Inc., Mineola, N.Y.

[21] Appl. No.: 247,925

[22] Filed: Mar. 26, 1981

[51] Int. Cl.³ .......................................... B27B 21/02
[52] U.S. Cl. ............................ 145/33 A; 145/33 E
[58] Field of Search ................................ 145/33–34

[56] References Cited

U.S. PATENT DOCUMENTS

| | | | |
|---|---|---|---|
| 1,040,832 | 10/1912 | Wood | 143/33 R |
| 1,394,174 | 10/1921 | Ireland | 143/33 R |
| 1,610,381 | 12/1926 | Jacobey | 145/34 R |
| 2,944,574 | 7/1960 | Johnson | 145/34 R |
| 3,807,471 | 4/1974 | Dreier | 145/33 E |
| 4,256,156 | 3/1981 | Bizzantz et al. | 145/33 A |

FOREIGN PATENT DOCUMENTS

| | | | |
|---|---|---|---|
| 396909 | 6/1924 | Fed. Rep. of Germany | 145/34 R |
| 1032005 | 3/1953 | France | 145/33 R |

Primary Examiner—James M. Meister
Attorney, Agent, or Firm—Holland, Armstrong, Wilkie & Previto

[57] ABSTRACT

A hack saw frame having a handle assembly, a body assembly and a front assembly adapted to hold a hack saw therebetween. The front assembly is pivotly mounted on the body assembly with manual means for pivoting the front assembly. When the manual means is moved in one direction, the front assembly will pivot to tighten and hold the blade in place. When the manual means is moved in the opposite direction, the blade is loosened to permit removal.

3 Claims, 4 Drawing Figures

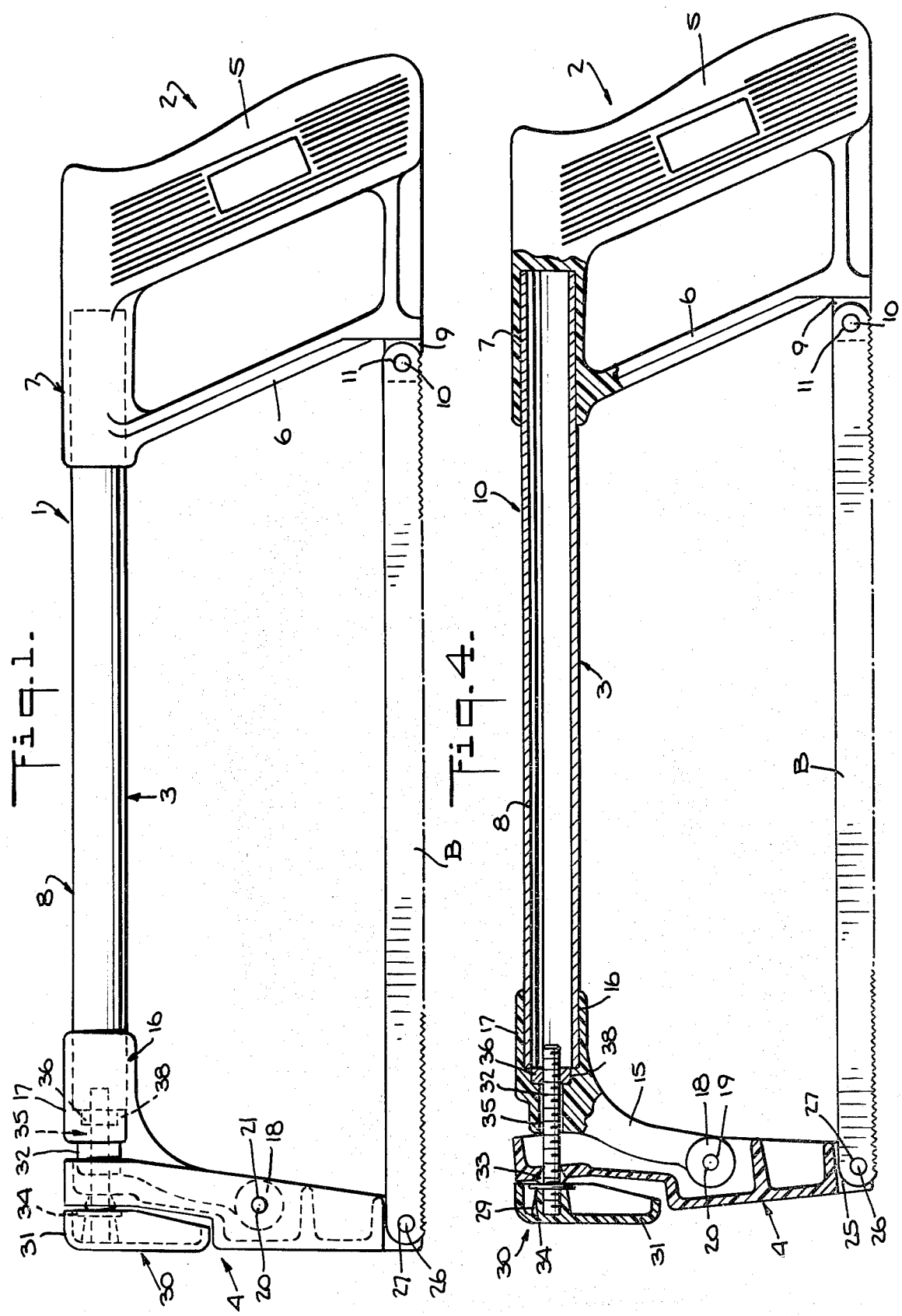

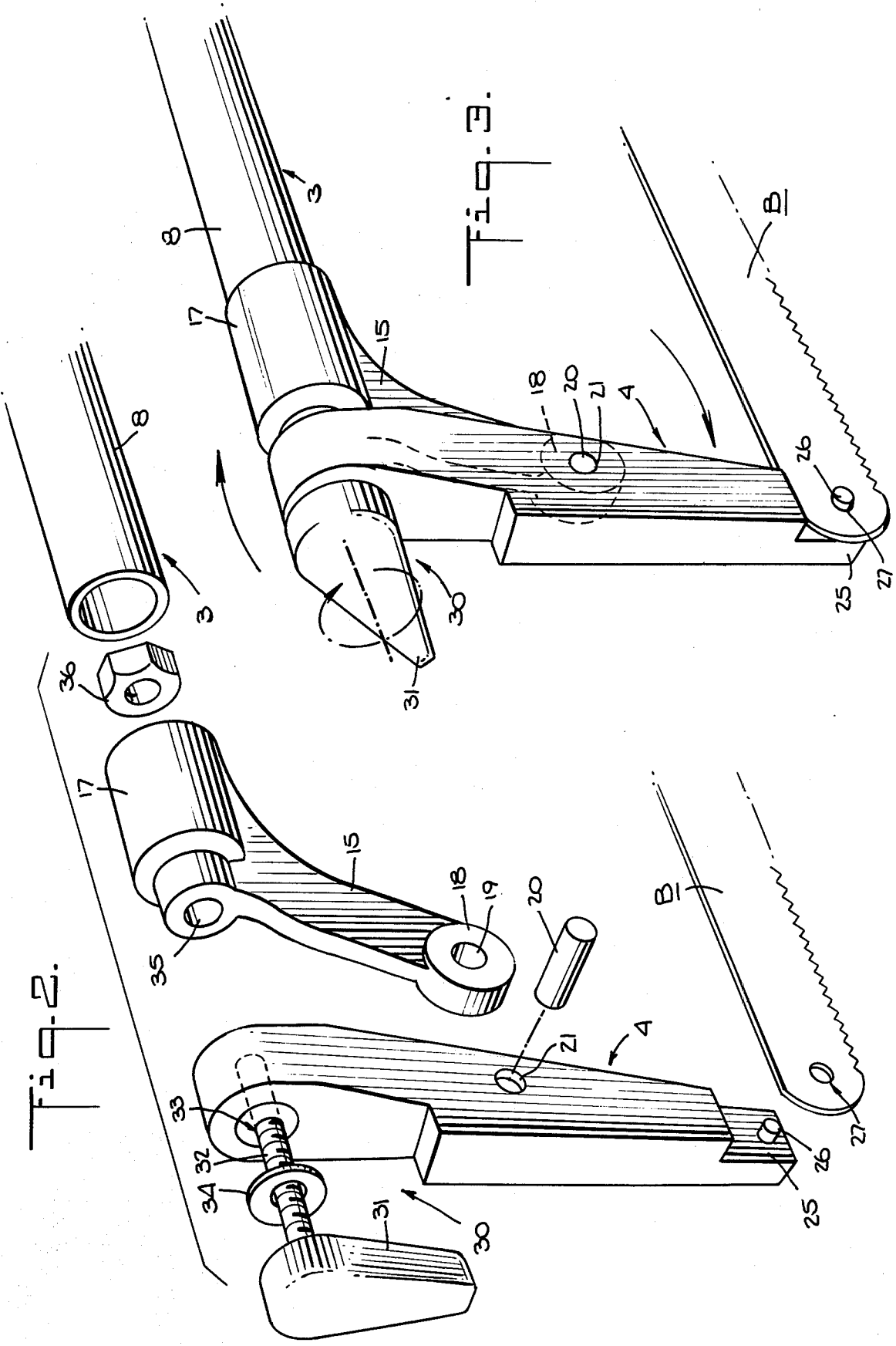

HACK SAW FRAME

DESCRIPTION

The present invention relates to hack saw frames and more particularly to an improved hack saw frame in which the frame may be easily adjusted to permit a hack saw blade to be easily inserted and removed from the frame.

Hack saw frames usually comprise a handle portion and a front portion connected by a body portion. The lower parts of the handle and front portions are adapted to receive and hold a hack saw blade therebetween. In order to properly tension the blade in the frame and lock it in place, in present frames the blade is mounted on a movable pin which extends from either the handle or the front portions and which is manually tightened to hold the blade therebetween.

The present invention provides an improved hack saw frame in which the tightening means for the blade are protected by the hack saw frame and not readily visible.

Another object of the present invention is the provision of an improved hack saw frame in which the tension on the blade may be easily adjusted manually.

Another object of the present invention is the provision of an improved hack saw frame in which the blade may be easily mounted and removed from the frame without the use of special tools.

Another object of the present invention is the provision of an improved hack saw frame which is easy to manufacture and to use.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a side elevational view of a hack saw frame made in accordance with the present invention.

FIG. 2 is an exploded perspective view of the front portion of the hack saw frame showing the blade-locking features of the present invention.

FIG. 3 is a perspective view showing the blade locked in place in the frame.

FIG. 4 is a partially sectional side view of the hack saw frame as shown in FIG. 1.

Referring more particularly to the drawings, the hack saw frame 1 of the present invention is adapted to hold a blade B therein and comprises a handle assembly 2, a body assembly 3 and a front assembly 4.

The handle assembly 2 is preferably in the form of a pistol-grip portion 5 with hand guard 6 spaced in front of the grip portion 5. The handle assembly 2 has a hollow tubular opening 7 extending forwardly from the upper part of the pistol-grip 5. The handle assembly 2 also has an extension 9 extending from the lower portion of the hand guard 6 with a pin 10 extending laterally therefrom. The pin 10 is adapted to receive the rear opening 11 of a hack saw blade B and to hold the rear part of the blade B in place.

The body assembly 3 comprises the tubular support portion 8, which is preferably hollow, and which has its rear end substantially permanently embedded in the opening 7 of the handle assembly 2. A forward downwardly extending nose portion 15 has a rearwardly facing extension 17 with a hollow opening 16 therein adapted to receive substantially permanently therein the forward end of the tubular support portion 8. The lower end of the nose portion 15 is provided with a journal 18 with an opening 19 therein through which extends a pin 20 for pivotally supporting the front assembly 4 thereon.

The front assembly 4 is preferably U-shaped in configuration and is adapted to receive the said journal 18 therewithin and has openings 21 therein to permit pin 20 to extend therethrough so that the front assembly 4 pivots relative to the front nose portion 15. The front assembly 4 has a lower end 25 having a pin 26 extending laterally therefrom which is adapted to be received in the front opening 27 in the forward end of the hack saw blade B so that the hack saw blade B is mounted between the pin 10 extending from the handle assembly 2 and the pin 26 extending from the front assembly 4.

It will be seen that as the front assembly 4 is pivoted around the pin 20 relative to the nose portion 15, the blade B is either tightened or loosened depending on the direction of movement of the front assembly 4. Thus, when the front assembly 4 is to be moved to tighten the blade B, it is pivoted in a clockwise direction (when viewed from FIGS. 1 and 4) so that the lower portion 25 moves out and applies pressure to the blade B to tighten it. When the front assembly 4 is to be moved to loosen the blade B, it is moved in a counter-clockwise direction (when viewed with respect to FIGS. 1 and 4) to move the lower portion 25 inwardly and loosen the blade B for removal from pins 10 and 26.

In order to pivot the front assembly 4 relative to the nose portion 15 and to lock it in the proper position, a locking assembly 30 is provided at the upper end of front assembly 4. The locking assembly 30 comprises a hand knob 31 having a threaded member 32 substantially permanently mounted thereon in boss 29 extending rearwardly therefrom toward the handle assembly 2. The upper portion of the front holding assembly 4 has an opening 33 therein through which the threaded member 32 extends. A washer or other suitable pressure-applying member 34 may be provided between the boss 29 and the front assembly 4. The forward end of the threaded element 32 extends through an opening 35 in the upper portion 17 of the body portion 3 and is adapted to threadedly extend through a threaded element 36 which is mounted in the upper part 17 of the front nose portion 15. Front nose portion 15 is countersunk at 38 to receive the opening 16 in the threaded element 36. It will be seen that when the threaded member 32 is rotated in one direction by the knob 31, it will move inwardly toward the interior of the tubular body member 8 and when the threaded member 32 is rotated by knob 31 in the opposite direction, it will move outwardly away from the tubular body member 8.

When the threaded member 32 is rotated by knob 31 to tighten the blade B, it moves inwardly and the pressure element 34 applies pressure to the upper portion of the front assembly 4 to pivot the front assembly 4 around pin 20 so as to move the upper part thereof inwardly and to move the lower portion 25 outwardly. This outward movement of the lower portion 25 applies tension to the lower portion on the blade B to hold the blade B straight and to tighten it between pins 10 and 26. When the threaded element 32 is moved in the opposite direction by the knob 31 to loosen the blade B, the front assembly 4 is pivoted in the opposite direction to permit the upper part of the front assembly 4 to move outwardly and the lower portion 25 to move inwardly to release the tension on the blade B thereby permitting the blade B to be removed.

With this structure, it will also be seen that by pivoting the front assembly 4 around the pivot pin 20, the blades of different sizes may be accommodated because the distance between the pins 10 and 26 will change. Furthermore, by merely turning the knob 31 at the front of the handle, the blade B can either be tightened for use or loosened for replacement.

It will thus be seen that the present invention provides an improved hack saw frame in which the tension of the blade may be easily adjusted and which is easy to manufacture and to use.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A hack saw frame comprising a handle assembly, a body assembly and a front assembly, means for holding a blade between said handle assembly and said front assembly, said front assembly being pivotly movable relative to said handle assembly in order to permit said blade-holding means to loosen or tighten its grip on a blade, said front assembly is pivotly mounted on a front portion of the body assembly, a locking assembly being provided to pivot said front assembly around its pivot mounting, said locking assembly comprising a knob in front of said front assembly and a threaded member extending rearwardly therefrom into said body portion whereby rotation of the threaded member will permit the front assembly to pivot.

2. A hack saw frame as claimed in claim 1, wherein said front assembly is hollow and wherein said knob has pressure means associated therewith to apply pressure to the front assembly, and wherein the threaded member has cooperating thread means mounted within the body portion of the frame.

3. A hack saw frame as claimed in claim 2 wherein the handle assembly is a grip assembly having a pin extending laterally therefrom at its lower end to hold one end of a blade, said body assembly being a hollow tubular assembly and being mounted in the upper portion of the handle assembly, a front nose portion extending downwardly from said body assembly, said front assembly being pivotly mounted on a journal in said front nose assembly, said handle assembly having a pin extending laterally therefrom to receive the forward end of a blade, said knob having the threaded member extending from an opening in the upper part of the handle assembly and through an opening in the upper part of said front nose portion.

* * * * *